United States Patent [19]
Farrow et al.

[11] Patent Number: 4,885,451
[45] Date of Patent: Dec. 5, 1989

[54] AUTOMATIC STEPPER FOR RESISTANCE WELDING

[75] Inventors: John F. Farrow, Plymouth; David W. Schulz, South Lyon, both of Mich.

[73] Assignee: Medar, Inc., Farmington Hills, Mich.

[21] Appl. No.: 192,001

[22] Filed: May 9, 1988

[51] Int. Cl.⁴ ............................................. B23K 11/24
[52] U.S. Cl. ................................... 219/110; 219/114; 219/117.1
[58] Field of Search ........................ 219/110, 117.1, 114

[56] References Cited

U.S. PATENT DOCUMENTS

| | | | |
|---|---|---|---|
| 3,546,421 | 12/1970 | Meyer | 219/110 |
| 4,254,466 | 3/1981 | Jurek | 219/110 |
| 4,289,948 | 9/1981 | Jurek et al. | 219/110 |
| 4,399,511 | 8/1983 | Jurek | 219/110 |
| 4,634,830 | 1/1987 | Furudate | 219/110 |

Primary Examiner—Clifford C. Shaw
Attorney, Agent, or Firm—Dykema Gossett

[57] ABSTRACT

A method is disclosed for controlling the magnitude of current delivered through welding electrodes to a workpiece to be welded using resistance welding techniques, in order to prevent weld expulsion and concomitant diminishment of weld quality. Weld expulsion is detected by determining changes in resistance during formation of the weld, by periodically determining the power factor, and the primary circuit of the welding transformer. The power factor is determined by determining the relative timing between the commencement of the applied voltage, the zero crossover point of the applied voltage, and the ensuing zero point of the applied current.

17 Claims, 5 Drawing Sheets

$V = E_m(\sin(\omega t + \lambda))$

AUTOMATIC STEPPER FOR RESISTANCE WELDING

TECHNICAL FIELD

The present invention generally relates to the welding controls and methods, particularly those used in resistance welding techniques, and deals particularly with a method for controlling the current delivered to a workpiece to be welded in order to avoid weld expulsion and concomitant diminishment of weld quality.

BACKGROUND ART

In resistance welding, two electrodes, typically of copper and cylindrical in shape, having spherical ends, are employed to apply relatively large electrical currents through metal to be welded. This flow of electric current results in heating of the metal to virtually melting temperature. Pressure is applied to the heated area through the electrodes to effectively forge the softened metal together to form a weld. The resulting weld joint is typically generally circular in area.

In the setting of a high-production environment, it is normally desirable to make a weld of this type in as short of a time interval as possible. This is typically accomplished by increasing the welding current and decreasing the time that the current is applied to a workpiece to be welded. However, in the event that welding in a current is increased too much, a phenomenon known as expulsion occurs. During expulsion, localized hotspots develop, when the temperature of the metal exceeds its melting point due to the metal being heated too quickly. The pressure of the welding electrodes, combined with magnetic effects, caused by the welding current, causes molten metal to be expelled from the weld.

Small amounts of weld expulsion are not seriously detrimental to weld quality; however, if expulsion becomes too severe, the strength of the weld is reduced due to the fact that some of the metal normally employed to form the weld area has been expelled. In addition to diminishment of weld quality, excessive expulsion results in sparks of hot metal, thus creating a safety hazard.

Due to the nature of the metal being welded, the current required to heat the metal to proper temperature to create an ideal weld in a reasonably short time interval, without excessive expulsion, is not a constant value. For example, in the case of welding workpiece materials such as galvanized or coated steel, physical changes occur to the surface of the welding electrodes which contact the workpiece. Over the course of effecting hundreds of welds, the spherical end of the welding electrodes becomes flattened out, thereby reducing the current concentration applied to the weld area. In the case of welding galvanized steel, the zinc on the surface of the steel alloys with the copper of the welding electrodes to form a layer of relatively low conductivity metal, i.e. bronze, on the working surfaces of the electrodes. These, and other effects, work in combination to cause the optimum welding current, i.e. sufficient current to weld quickly without excessive expulsion, to trend upwardly in magnitude as the welding electrodes deteriorate with use.

In the past, a so-called "stepper" function has been included in the welding controller in order to compensate for the welding process drift described above. Typically, after a number of welds are performed, the stepper function causes the welding current applied to be increased by a predefined small increment. Then, after a further certain number of welds are made, the welding current is again stepped up by some small increment. The number of welds and the weld current increase per step is usually user-programmed so that, based on experience, the operator can program these numbers so that the welding is increased in what he believes will be the proper amount as the welding electrodes deteriorate with continued use.

The above-described user-programmable steppers are less than completely satisfactory because they do not follow all process variations. For example, when welding galvanized steel, the rate of electrode deterioration is heavily influenced by variations in the thickness of the zinc coating. Under typical production conditions, variations of greater than 2 to 1 in the rate of electrode deterioration are common. In addition, other variables, such as electrode cooling water temperature and variations in welding electrode force, result in further uncertainty as to the rate of welding electrode deterioration. As a result of these process uncertainties, the operator can at best set the weld stepper program to provide a "best compromise" weld. The operator is thus forced to rely on time-consuming and costly weld test procedures to determine whether the weld stepper program is properly set up.

As alluded to above, the magnitude of welding current required to produce an ideal weld is that which is slightly less than the amount that causes weld expulsion. If the ideal current is slightly exceeded and a small amount of expulsion occurs, the affect on weld quality is quite small. However, this ideal amount of welding current shifts upwardly as the welding electrodes deteriorate with use, as previously discussed.

Thus, there is a need in the art for a method of controlling welding current so as to maintain it at ideal levels in spite of the various process variables described above.

SUMMARY OF THE INVENTION

According to the invention, a method is provided for controlling the magnitude of current delivered to a workpiece through resistance welding electrodes in a resistance welder of the type employing alternating electrical current and electrodes to apply this current to the workpiece to be welded. The method includes the steps of determining the time interval between the application of voltage to the electrodes and the following zero crossover of the voltage, determining the time interval between the zero crossover point of the voltage and the following zero point of the current resulting from the application of the voltage, determining the value of the power factor of the circuit employed to apply the current, using the two time intervals determined above, the expulsion of molten metal from the weld being a function of the value of the power factor, and, finally, changing the magnitude of the current based, at least in part, on the value of the power factor. The value of the power factor is indicative of the change in electrical resistance of the weld, which in turn is indicative of the magnitude of weld expulsion. According to one preferred embodiment, the power factor is repeatedly determined in successive welds, and the magnitude of the current is changed only when the power factor is in preselected relationship to a reference value corresponding to a weld in which at least some degree of weld expulsion occurs. When the power factor is in fact in preselected relationship to the reference value, the magnitude of current is decreased. The magnitude of the welding current is increased when the value of the power factor for each of a preselected number of welds indicates that expulsion of molten material has not occurred. The determination of the power factor may be delayed a preselected period of time after commencement of the flow of electrical current, if desired, to eliminate erroneous results. In a further embodiment, a plurality of the welds are classified into acceptable and unacceptable categories based upon the respective power factors determined during the welds, first and second counts of the acceptable and unacceptable welds are respectively accumulated, the counts are compared with first and second reference values, and the magnitude of the current is changed based upon the comparison of the counts.

According to an alternate embodiment of the invention, a method of controlling the level of current applied to a weld in a resistance welded supplied with alternating electrical current involves the steps of: determining the pokint in time when the voltage is switched to the transformer primary of the welder, determining the time intervals between the point in time when the voltage is switched on and the respective zero points of the alternating voltage and the current applied to the transformer primary, determining the change in impedance in the primary circuit to which the transformer is connected based on the determined time intervals where changes the impedance are related to changes in the resistance in the primary circuit caused by formation of the weld, and changing the magnitude of the current based at least in part on the sensed change in impedance.

BRIEF DESCRIPTION OF THE DRAWINGS

In the drawings, wherein like reference numerals are employed to designate identical components in the various views.

DESCRIPTION OF THE PREFERRED EMBODIMENTS

According to the present invention, a level of current applied in making a weld is adjusted based upon the detection of weld expulsion. Weld expulsion, in turn, is detected by measuring the power factor of the primary transformer circuit employed to apply current to the welding electrodes. Before discussing the method of the present invention further, the nature of the general type of resistance welder with which the present invention is concerned will be discussed, and a technique for measuring the power factor according to the present invention will be described.

Figure 1:
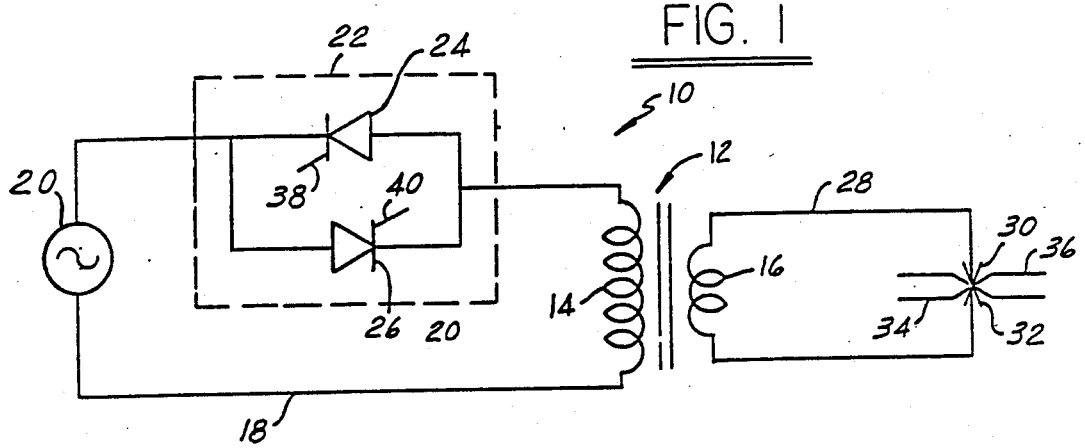
FIG. 1 is a schematic diagram of a typical resistance welder with which the method of the present invention may be practiced.

As shown best in FIG. 1, the usual resistance welder 10 includes a welding transformer 12 having a primary winding 14 and a secondary winding 16.

The primary winding 14 is connected through a primary circuit 18 to a source of alternating electrical energy 20 through contactor structure 22. The contactor structure 22 includes thyristors 24 and 26, which are either ignition tubes or silicon controlled rectifiers, connected in inverse parallel in the primary circuit 18, as shown in FIG. 1.

The secondary winding 16 of the transformer 12 is connected in the secondary circuit 28 of the resistance welder 10 to provide high-current, low-voltage signals across welding electrodes 30 and 32 to provide the heating required for a resistance weld of the workpiece members 34 and 36.

In this type of resistance welder, it is usual practice to include an electronic welding control to provide a firing point signal on the gate electrodes 38 and 40 of the thyristors 24 and 26 to permit control of the energy provided at the workpieces 34 and 36 by means of varying the timing of turn on pulses in relation to the applied power line voltage so that different conduction angles are achieved. It is further usual practice to include on the electronic welding control a user-settable adjustment so that desired rate of energy applied to the weld may be selected. The adjustments are usually labeled "percent heat" or "primary current" and are calibrated in percent or amperes.

100% heat in resistance welding structures such as shown in FIG. 1 corresponds to the energy rate that would be applied to the weld if the primary of the welding transformer was connected directly to the incoming power line. This energy rate is a function of the impedances of the welding transformer and the welding circuit, and the weld itself, as well as the voltage of the incoming power line. By using phase control, that is, synchronous switching, of the contractor, a welding control, in response to a particular setting of percent heat adjustment, reduces the energy flow at the weld to the desired percentage of the maximum available.

In order to effect a reduction of welding power to the desired percent of maximum power, a welding control must take into account the apparent power factor that appears at the primary of the welding transformer.

Figure 2:
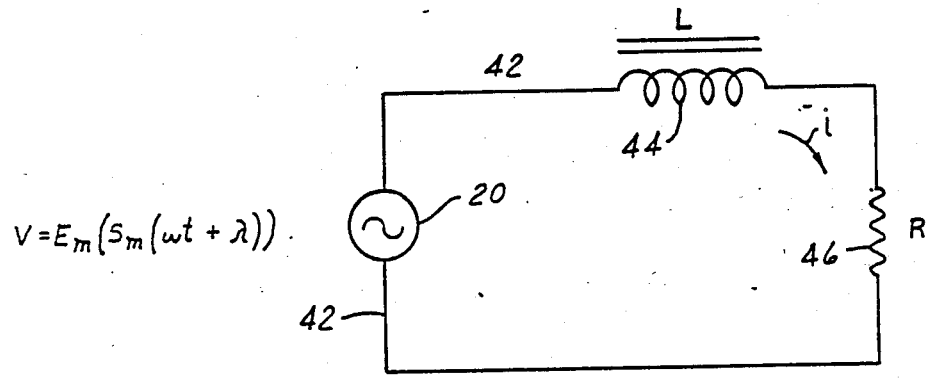
FIG. 2 is an equivalent circuit of the welding circuit of the resistance welder illustrated in FIG. 1 as it appears in the primary circuit of the transformer.

Since the nature of high-current resistance welder structure 12 is always inductive, it always has a lagging power factor. Thus, looking into the primary circuit of an operating resistance welding transformer, with its secondary load, the equivalent circuit 42 includes inductance 44 and resistance 46 in series with the source of alternating electrical energy 20, all as shown in FIG. 2.

The resistance 46 is the effective sum of all the resistance in the circuits 18 and 28, including the resistance of the material to be welded. The inductance 44 is the effective sum of all the inductances in the circuits. The power factor of the circuit 42 is a function of both the resistance 46 and the inductance 44. The equation (1) for the power factor for this equivalent circuit is:

$$PF = \frac{R}{\sqrt{Z_L^2 + R^2}} \text{ and } 0 \leq PF \leq 1 \quad (1)$$

where:
PF equals the power factor of circuit 42;
R equals resistance 46;
$Z_L$ is the reactance of the inductance 44 at a particular frequency, which in the case of a 60 Hz power line is 60 Hz.

The effective reactance of the inductance 44 increases greatly as the incoming power waveform is phase-controlled to control current, that is, as the firing point of the thyristors 24 and 26 is varied. This change in the effective reactance is due to the fact that as a 60 Hz waveform is chopped up, phase-controlled harmonics are generated.

Thus, as the firing points of the contactor are retarded, the energy content of the harmonics of the waveform applied to the welding transformer primary increases as a portion of the total energy applied, while total energy applied decreases. The effect of this is to increase the reactance of the inductance in the welding circuit, because the inductance presents a higher impedance to higher frequency signals.

Therefore, the relationship between firing angles of the thyristors and energy delivered to the resistive portion of the circuit of FIG. 2 is quite different for different ratios of R and L (i.e. different power factors) in the circuit in FIG. 2. If, however, the welding control is to be able to correct for variations in power line voltage, the ratio of R and L must be known so that the relationship between firing angle and relative energy delivered to the resistive portion of the circuit of FIG. 2 can be determined and used to correct for power line voltage changes.

Figure 3:
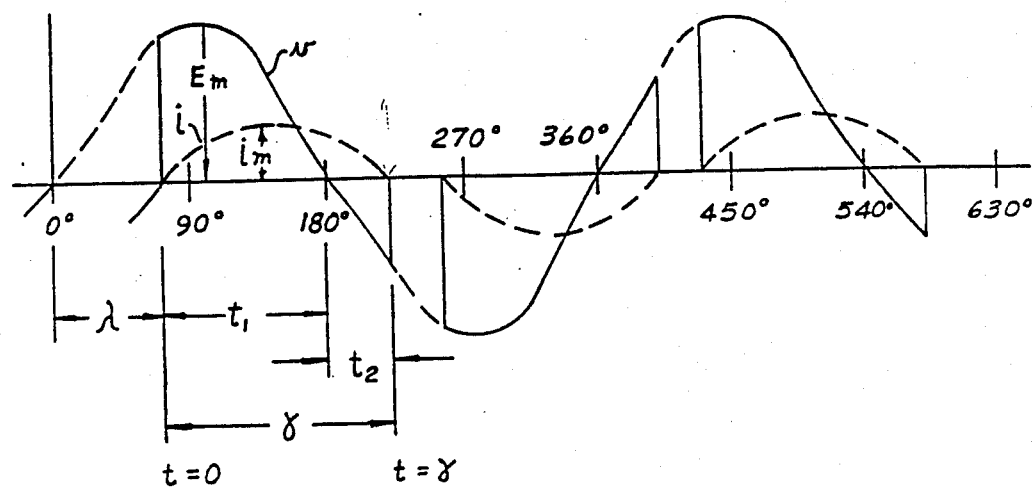
FIG. 3 is a waveform diagram of the alternating voltage and current signals in the primary circuit of the resistance welder illustrated in FIG. 1.
Figure 4:
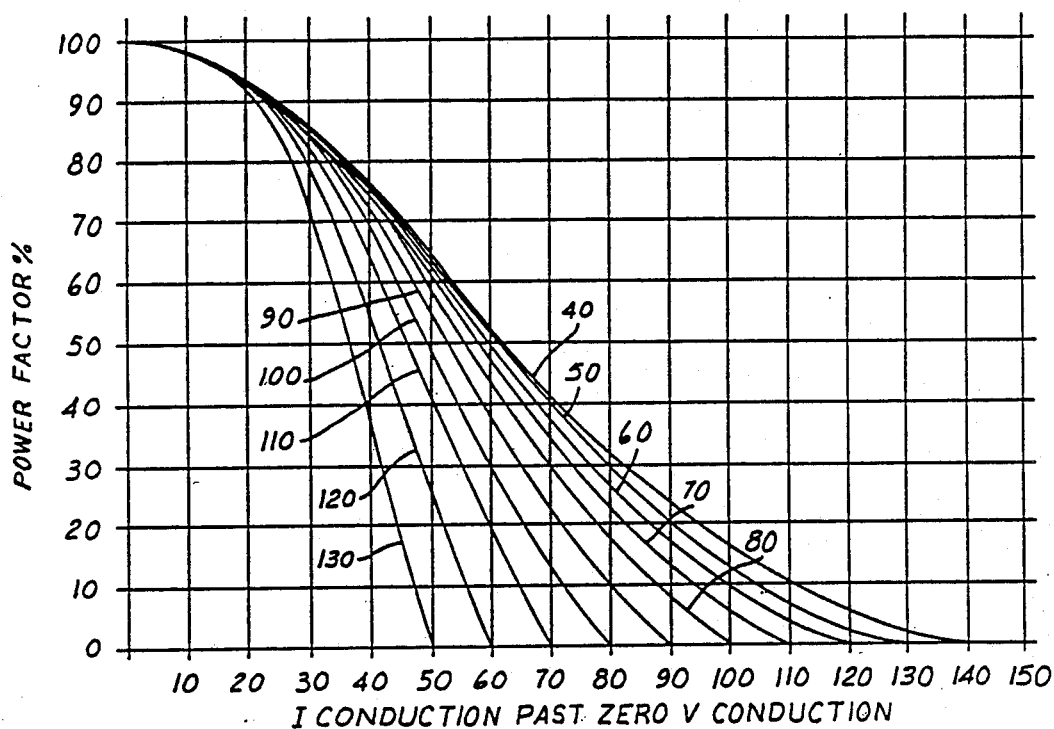
FIG. 4 is a graph representing of the relationship between the power factor, current conduction after zero voltage crossover, and firing angle delay in the resistance welder of FIG. 1.
Figure 5:
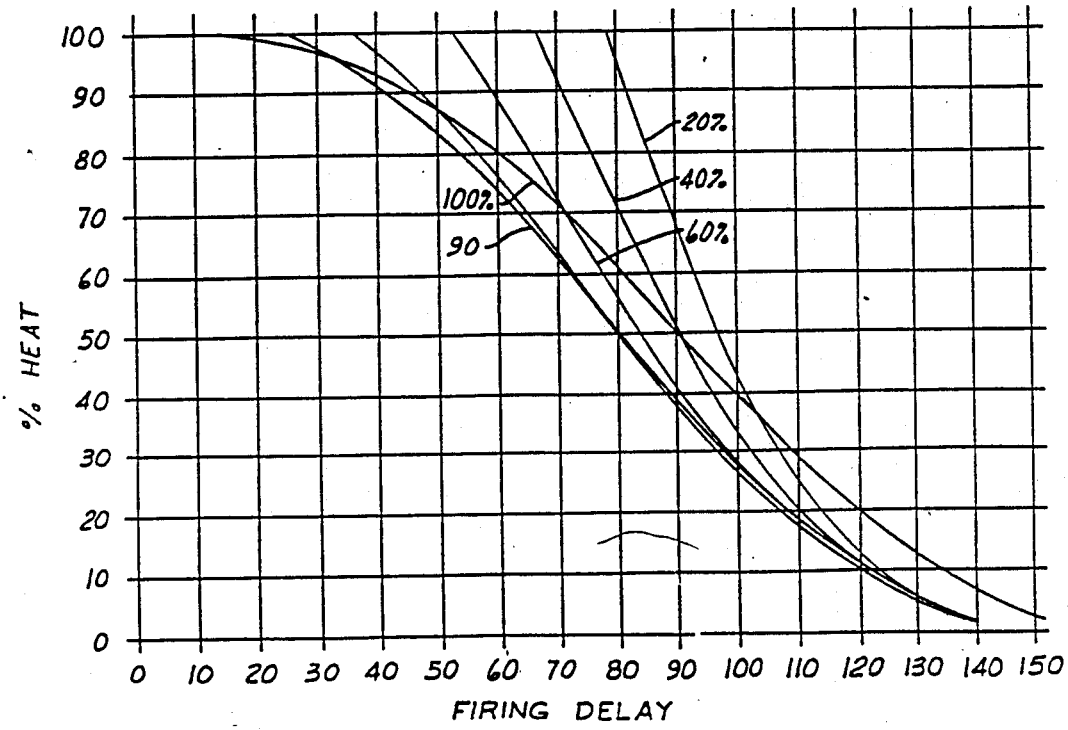
FIG. 5 is a graph representation of the relationship between percent heat selected, firing angle delay and selected power factor in the resistance welder circuit of FIG. 1.

The ratio of R and L can be determined by measuring two time intervals shown in FIG. 3. In FIG. 3, $t_1$ is the time interval between the turn-on time of the thyristors and the applied power line voltage zero crossing. The amount of time the current flows past the following power line voltage zero crossing is designated $t_2$ in FIG. 3.

For a given time, $t_1$, there is a definite relationship between $t_2$ and the ratios of R and L in the circuit of FIG. 2. Stated another way, if $t_1$ and $t_2$ are known, then the power factor of the welding structure (the ratio of R to L in FIG. 2) can be found, because of the definite relationship between $t_1$, the power factor of the circuit and $t_2$.

Once the power factor of the circuit is known, then the relationship between relative energy delivered to the resistive portion of the circuit and the firing angle of the thyristors can be determined. This relationship can be used for several purposes. First, it allows the control to accurately set the firing angle of the thyristors in response to a user-entered percent heat setting. Second, if the power line voltage changes during weld time, the control can compute the exact amount that the firing angle of the thyristor needs to be moved in order to keep the energy delivered to the resistive portion of the circuit, which includes the weld, constant in spite of the power line voltage change. In addition, in connection with the method of the present invention, the power factor can be employed to determine the degree, if any, of weld expulsion.

The following is a mathematical explanation of what the control does, followed by a hardware description.

Consider the circuit of FIG. 2 and assume it includes the contactor structure 22 of FIG. 1 between the source of energy 20 and the inductance 44. The contactor structure 22 is shown as a pair of SCR's for convenience, but it could as well be constructed utilizing a pair of ignitron tubes, a triac, or other similar devices.

The inductance, L, represents the apparent inductance that appears in the primary circuit of a resistance welding transformer mostly due to the inductance of the secondary loop of the welder. The remaining part of the inductance is due to the characteristics of the transformer itself.

The resistance R represents the effective resistance of all the resistive components in the welding circuit, including the resistance of the weld itself.

The following analysis considers the events of a single, positive, polarity half-cycle of the input power on the power line. A list and explanations of the terms used in the equations in the analysis follows. It is assumed that the voltage drop on the thyristors is negligible.

i = Instantaneous current through the circuit.
$I_m$ = Maximum instantaneous value of current in the circuit.
ω = The angular velocity of the applied sinusoidal AC power line voltage = 2πF (F = 60 Hz in U.S.).
θ = The natural power factor angle $$= \tan^{-1} \frac{\omega L}{R}$$

L = The inductance of the circuit.
R = The resistance of the circuit.
λ = Firing angle, that is, the point in terms of degrees or radians past the zero-crossing point where the contactor is triggered on.
t = Time, measured in seconds. t = 0 is the time when the contactor is triggered on.
v = The instantaneous value of the applied power line voltage, defined as v = $E_m$ (sin (ωt + λ)).
$E_m$ = The maximum instantaneous value of the applied power line voltage.
β = (λ − θ).
γ = Time at which current is zero after t = 0 (conduction angle).
e = Base of natural logarithms.

The equation for the voltage in the circuit of FIG. 2 is expressed in the form:

$$E_m \sin(\omega t + \lambda) = L \frac{di}{dt} + iR \text{ where } 0 < t \leq$$

$$\frac{Ldi}{dt} = \text{voltage across } L$$

$$iR = \text{voltage across } R$$

or $$\frac{E_m}{L} \sin(\omega t + \lambda) = \frac{di}{dt} + \frac{R}{L} i \quad (1)$$

Equation (1) must be integrated to get rid of the di/dt term. Fortunately, it is of the form of $dy/dx + Py = Q$ where P and Q are functions of X.

The solution of this equation form is:

$$ye^{\int Pdx} = \int Q e^{\int Pdx} dx.$$

Substituting $y = i$, $P = R/L$, $dx = dt$ and $$Q = \frac{E_m}{L}\sin(\omega t = \lambda)$$

from equation (1) yields:

$$ie^{\int \frac{R}{L} dt} = \frac{E_m}{L}\int \sin(\omega t + \lambda) e^{\int \frac{R}{L} dt} dt + C_1 \qquad (2)$$

where $C_1$ is a constant related to boundary conditions.

Carrying out the integrations on both sides and simplifying yields:

$$ie^{\frac{Rt}{L}} = \frac{E_m}{\sqrt{R^2 + (\omega L)^2}}\sin(\omega t + \lambda - \theta) + C_1 \qquad (3)$$

This equation (3) is valid only for $0 \leq t \leq \gamma$.

A simplification of equation (3) is possible using the following identity:

$$\frac{E_m}{\sqrt{R^2 + (\omega L)^2}} = \frac{E_m}{Z} = I_m$$

so the equation becomes:

$$ie^{\frac{Rt}{L}} = I_m e^{\frac{Rt}{L}}\sin(\omega t + \lambda - \theta) + C_1 \qquad (4)$$

In order to evaluate equation (4), a further simplification can be made by realizing that at $t = 0$, $i = 0$. So at $t = 0$, equation (4) becomes:

$$0 = I_m \sin(\lambda - \theta) + C_1 \qquad (5)$$

Substituting equation (5) into equation (4) gets rid of $C_1$ and yields the result:

$$i = I_m(\sin(\omega t + \lambda - \theta) - \sin(\lambda - \theta) e^{-\frac{Rt}{L}}) \qquad (6)$$

using the identity $= \tan^{-1} \omega L/R$, $R/L = \omega \cot \theta$ puts all the ratios of R and L in equation (6) in terms of $\theta$, the natural power factor angle. This change simplifies the following discussions.

With this change, equation (6) becomes:

$$i = I_m(\sin(\omega t + \lambda - \theta) - \sin(\lambda - \theta) e^{\omega t \cot \theta}) \qquad (7)$$

Equation (7) is valid if functions outside limits $0 \leq t \leq \gamma$ are discounted.

This equation allows $\theta$, the natural power factor angle to be computed if $\gamma$, the time after $t = 0$, that $i = 0$, and $\lambda$, the firing angle (see FIG. 3) are known.

In practice, it is quite easy to determine $\gamma$ and $\lambda$. The firing angle $\lambda$ is a parameter that may be very accurately controlled. The value of $\gamma$ may be easily determined by using a timer to measure the time interval between $t = 0$ and the time when $i = 0$. Once $\lambda$ and $\gamma$ are known, $\gamma$ is substituted for $t$ and the equation is solved for $\theta$. Once $\theta$ is known, the power factor may be computed by the identify $PF = \cos \theta$ and the ratio $R/L$ may be computed by the identity $R/L = \omega \cot \theta$.

Equation (7) is the basic equation used to compute power factor given firing angle $\lambda$ and the time $\gamma$ when $i = 0$ after firing.

Equation (7) in integrated from is also used to determine the relationship between percent heat and firing angle, or put in a mathematical way, the relationship $(I_{RMS}/I_{RMS(max)})^2$, since percent heat, the proportion of available energy delivered to the resistive part of the circuit, is a function of RMS current squared.

The RMS current during a single half-cycle in the circuit of FIG. 2 is given by the equation:

$$I_{RMS} = \sqrt{\int_{t_1}^{t_2} \frac{i^2 dt}{T_a}}$$

where: P $t_1 =$ time of firing (same as $t = 0$ in FIG. 3)
$t_2 = $ (time where $i + 0$ after $t = 0$)
$T_a =$ averaging time period Converting from time units to units of angular displacement for convenience in calculation:

$$I_{RMS} = \sqrt{\int \frac{\omega^{t_2} i^2 dt}{\omega\, t_1 w t a}}$$

Using radians to simplify calculations, $\omega t a$ becomes $\pi$, the duration i radians of $\frac{1}{2}$ cycle.

Substituting equation (7) for i in equation (8) and setting the integration limits to appropriate values (0 and $\gamma$), the result becomes:

$$I_{RMS} = \sqrt{\int_0^\gamma \frac{i^2 dt}{\pi}}$$

$$I_{RMS} = \qquad (9)$$

$$\sqrt{\frac{I_m^2}{\pi} \int_0^\gamma \sin(\omega t + \lambda - \pi) - \sin(\lambda - \theta) e^{-\omega t \cot \theta}\, {}^2 d(\omega t)}$$

In order to form the ratio $I_{RMS}/I_{RMS(max)}$, it should be recognized $I_{RMS}$ (max occurs when the contactor is on all the time (mathematically $t_o = \gamma 0$) and all waveforms are sinusoidal, like the incoming power line voltage. Under these conditions, the expression for $I_{RMS}$ (max) is as follows:

$$I_{RMS}(\max) = \frac{I_m}{\sqrt{2}}$$

Using this fact, the expression for the ratio $I_{RMS}/I_{RMS(max)}$ becomes:

$$\frac{I_{RMS}}{I_{RMS \text{ (max)}}} = \sqrt{\frac{2}{\pi} \int_0^\gamma (\sin(\omega t + \lambda - \theta)} \quad (10)$$

$$\sqrt{\frac{2}{\pi} \left( \int_0^\gamma \sin^2(\omega t + \lambda - \theta) d(\omega t) - 2\sin(\lambda - \theta) \int_0^\gamma \sin(\omega t + \lambda - \theta) \right.}$$

$$\left. e^{-\omega t \cot\theta} d(\omega t) + \sin^2(\lambda - \theta) \int_0^\gamma e^{-2\omega t \cot\theta} d(\omega t) \right)$$

For convenience, the three integral terms of equation (10) are integrated separately. These integrals are shown in equations (11), (12), and (13).

$$\int_0^\gamma \sin^2(\omega t + \lambda - \theta) d(\omega t) = \quad (11)$$

$$\left[ \frac{\omega t + \lambda - \theta}{2} - \frac{\sin 2(\omega t + \lambda - \theta)}{4} \right]_0^\gamma =$$

$$1/2 \left( \frac{\gamma + \sin 2(\lambda - \theta)}{2} - \frac{\sin 2(\gamma + \lambda - \theta)}{4} \right) =$$

$$\frac{\gamma}{2} + \frac{\sin 2(\lambda - \theta)}{4} - \frac{\sin 2(\gamma + \lambda - \theta)}{4}$$

$$-2\sin(\lambda - \theta) \int_0^\gamma \sin(\omega t + \lambda - \theta) e^{\omega t \cot\theta} d(\omega t) = \quad (12)$$

$$-2\sin(\lambda - \theta) \sin^2 \theta_0{}^\gamma e^{\omega t \cot\theta} (\omega - \cot\theta \sin(\omega t + \lambda - \theta)$$

$$\cos(\omega t + \lambda - \theta) =$$

$$-2 \sin(\lambda - \theta) \sin^2\theta (e^{-\gamma\cot\theta} (-\cot\theta\sin(\gamma + \lambda - \theta) -$$

$$\cos(\gamma + \lambda - \theta) + \cot\theta\sin(\lambda - \theta) + \cos(\lambda - \theta) =$$

$$+2 \sin(\lambda - \theta) \sin\theta (e^{-\gamma\cot\theta} \sin(\gamma + \lambda) + \sin\gamma)$$

$$\sin^2(\lambda - \theta) \int_0^\gamma e^{-2\omega t \cot\theta} d(\omega t) = \quad (13)$$

$$\left[ \frac{-\tan\theta}{2} \sin^2(\lambda - \theta)(e^{-2\omega\cot\theta} - 1) \right]_0^\gamma =$$

$$\frac{-\tan\theta}{2} \sin^2(\lambda - \theta)(e^{-2\gamma\cot\theta} - 1)$$

Substituting equations (11), (12) and (13) in equation (10) yields the result:

$$\frac{I_{RMS}}{I_{RMS(max)}} = \quad (14)$$

$$\left( \sqrt{\frac{2}{\pi}} \left( \frac{\gamma}{2} + \frac{\sin 2(\lambda - \theta)}{4} - \sin 2\frac{(\gamma + \lambda - \theta)}{4} + \right. \right.$$

$$2 \sin\theta\sin(\lambda - \theta)(\sin\gamma + \sin(\gamma + \lambda) e^{-\gamma\cot\theta}) -$$

$$\left. \left. \frac{\tan\theta}{2} \sin^2(\lambda - \theta) (e^{-2\gamma\cot\theta} - 1) \right)^{\frac{1}{2}} \right.$$

Equation (14) relates firing angle, $\lambda$, natural power factor angle, $\theta$, total conduction angle, $\gamma$, and proportion of available RMS current for a particular power line voltage. Calculating the function $(I_{RMS}/I_{RMS(max)})^2$ involves simply squaring equation (14).

Equations (7) and (14) are used in the following way. If the power factor of the welding structure 10 is not known, the control will assume a power factor of 10 percent ($\theta = 84.26$ degrees). This value of $\theta$ is substituted into equation (7) and equation (7) is solved for $\gamma$ (the value of t where i=0) in terms of $\lambda$, the firing angle. Substituting this into equation (14), equation (14) is solved for $\lambda$, the firing angle which corresponds to the desired value of $I_{RMS}/I_{RMS(max)}$ The contactor is then fired for the next two half cycles at the computed firing angle, $\lambda$. Measurements of $\gamma$ are taken and equation (7) is used to compute a corrected value of $\theta$. For any succeeding cycles, this same process is done again, starting with the third sentence of this paragraph (i.e. if $\theta$ is known, there is no need to take a guess at it).

This process allows the control to compute a firing angle which corresponds to a desired user-set percent heat.

Furthermore, it allows an accurate user percent heat setting to be implemented. That is, if the user wants the energy rate delivered to the weld to be say 50 percent of its maximum value, he need merely enter 50 percent and the control will take into account power factor to compute the proper firing angle. If the power factor shifts ($\theta$ changes), this is corrected for within one cycle, because the control re-computes $\theta$ on each and every cycle. Also, however, the user may determine the existence and degree of any weld expulsion as well as the trend of such expulsion based on shifts in the power factor.

Once a stable and accurate control of percent heat, independent of any value of power factor, is achieved, the control can also do very effective power line voltage compensation. That is, it can eliminate the variations in welding current caused by power line voltage shifts.

In compensating for power line voltage shifts, a nominal value for the power line voltages is assumed. This value is the standard to which the actual power line voltage is compared. This nominal line voltage value may or may not be user-settable.

For a given circuit, and firing angle, the energy delivered to the welding circuit is a function of the power line voltage squared. That is, if the power line voltage changes from the nominal value, $V_1$, to a different value, $V_2$, the energy delivered to the welding circuit will change by a factor K, equal to $(V_1/V_2)^2$.

Since equations (7) and (14) allow the control to implement an accurate percent heat setting, correcting for power line voltage changes consists simply of adjusting the value of the user percent heat setting by multiplying it by the factor 1/k. That is, corrected heat setting=user percent heat setting $x(V_1/V_2)^2$ where, $V_2$=nominal line voltage, and $V_1$=actual line voltage.

Constant current control of the welding current may also be implemented, using a slightly different method and reading the value of i (as in FIG. 2) instead of power line voltage. The method is as follows.

Initially, if the value of $\theta$ (power factor) is not known, the control fires the first two half-cycles of welding current at a fairly large value of $\lambda$, corresponding to a low power factor and low welding current.

Measurements of $\gamma$ and i are taken. Measurements of i are taken in such a way that the true RMS value, that is, $I_{RMS}$ as in equation (14) can be obtained. Substituting the known values of $\lambda$ and $\gamma$ into equation (7) allows the value of $\theta$ to be found. The known values of $\theta$, $\lambda$, $\gamma$ and $I_{RMS}$ (i measurement) are put into equation (14) and the value of $I_{RMS(max)}$ is determined. If this value of $I_{RMS}$ maximum is lower than the user-set desired current value, the control will alert the operator to the fact that the current value entered is not attainable.

Assuming that $I_{RMS}$ is more than the user set desired current value, the user-set desired current value is substituted for $I_{RMS}$ in equation (14), and the calculated $I_{RMS(max)}$ value is also put into equation (14). The known value of $\theta$ (power factor angle) is sibstituted into equation (7) and equation (7) is solved for $\gamma$ in terms of $\lambda$. This result is substituted into equation (14) so that equation (14) may be solved for $\lambda$, the new desired firing angle. This process repeats each cycle, skipping the initial step of taking a "guess" at the value of $\lambda$ if $\theta$ is known.

If both the power line voltage and the current i in the circuit are measured, correction for changes in power factor of the welding circuit may be compensated for as well as changes in the power line voltage.

If both applied voltage, v, as in FIG. 2, and resultant current $I_{RMS(max)}$ are known, the total impedance 2 of the circuit may be calculated using Ohm's Law.

$$2 = \frac{v}{I_{RMS(max)}} = \sqrt{X_L^2 + R^2} \quad (15)$$

$X_L$ = Impedance of Inductor $R$ = Value of Resistance

As it has been shown, it is possible to determine the power factor of a circuit by measurement of $\lambda$ and as in equation (7). The ratio of R to L in the circuit is related to $\theta$, the natural power factor angle obtained from equation (7) by the relationship:

$$\theta = \tan^{-1}\frac{L}{R} \omega = 2\pi F; F = 60 \text{ Hz Power Line} \quad (16)$$

By using equation (14) and (16), the absolute values of R and L can be found. With this information, a host of possibilities arises.

One possibility is to maintain constant energy flow delivered to the resistive portion of the circuit, regardless of changes in R, L or applied line voltage, v.

Another possibility is to determine whether or not the welding machine is working properly. Since the values of R and L can be measured, these can be compared to known good values and any change detected.

However, as another possibility, in accordance with the present invention, the existence or degree of weld expulsion can be determined.

Figure 6:
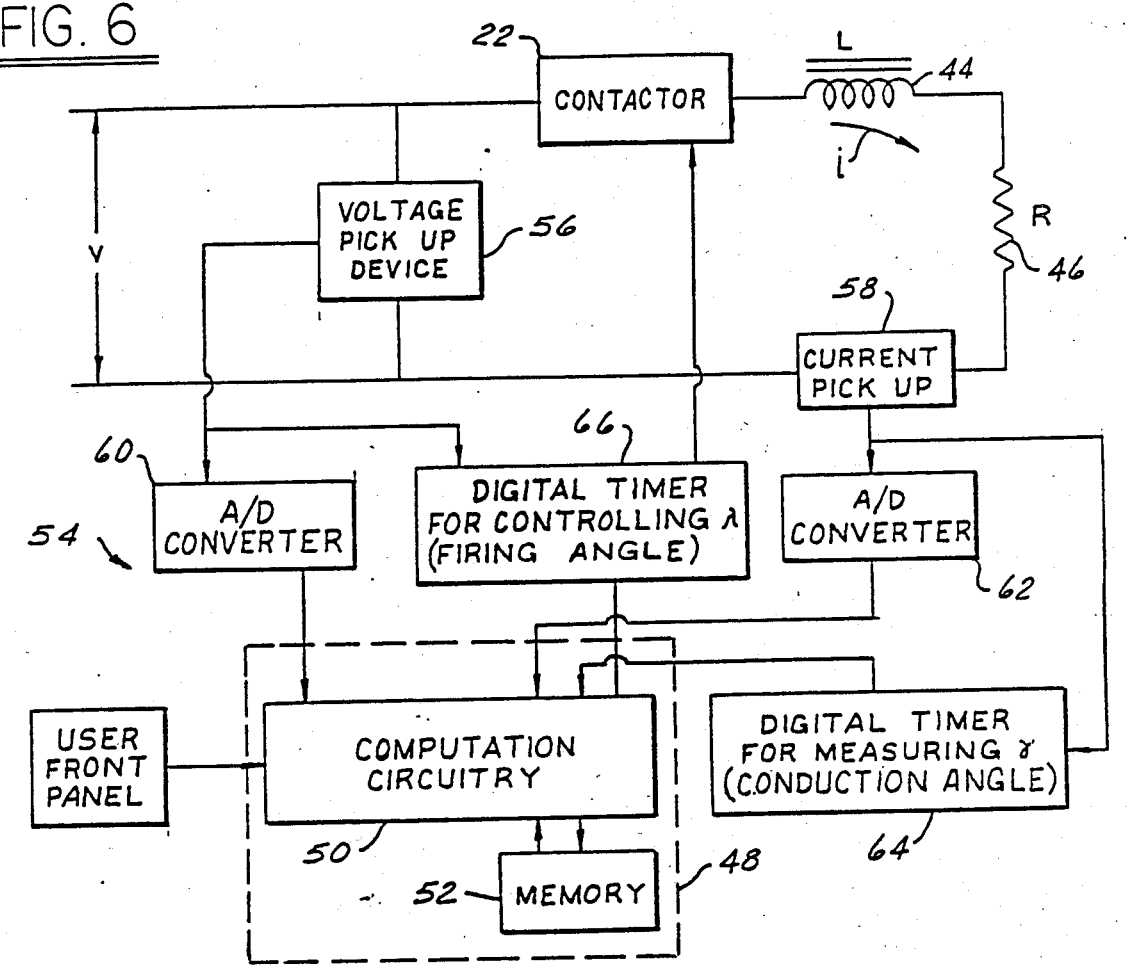
FIG. 6 is a block diagram of a resistance welding controller suitable for practicing the method of the present invention, connected to a resistance welding circuit of the type illustrated in FIG. 1.

The electronic circuitry needed to implement the control method described mathematically is shown in FIG. 6.

The computation circuitry takes the digitized values of $\gamma$, v and i (optional) and the user entered values and performs the operations previously described. The output of these computations is a digital number outputted to control $\lambda$, via a digital timer triggered from the power line voltage zero crossings. This timer then outputs a pulse or strings of pulses when the time represented by the preload number has elapsed.

The timer for measuring $\gamma$ is triggered on by the flow of current i in the circuit. The timer stops when i=O. A digital value representing the time duration that current flowed is then available at the timer output.

The computation circuitry could be built up of discrete digital logic, analog components or any type of programmable computer within the skill of the electronic control art.

In the present implementation, the computation circuitry 48 consists of a Z-80 microcomputer 50 and an appropriate memory 52 to hold the needed program and all the intermediate results of the calculations.

The control 54 for practicing the method of the invention as shown in FIG. 6 besides the computation circuitry 48 includes a voltage pick-up device 56, current pick-up device 58 and analog to digital converters 60 and 62 connected between devices 56 and 58 and the computation circuitry respectively.

A digital timer 64 is also connected between the current pick-up device 58 and the computation circuitry 48 for measuring the conduction angle ($\gamma$).

A second digital timer 66 is connected between computation circuitry 48 and the contactor 22 in welding circuit 10 and to the voltage pick-up device 56. Digital timer 66 functions to provide firing pulses for contactor 22 a predetermined time after a voltage zero voltage crossover in accordance with a signal received from the computation circuitry 48.

The user front panel 68 is connected to the computation circuit 48 and permits user setting of percent heat or primary current desired in accordance with the above discussion.

In the preferred implementation, the equations (7) and (14) are not calculated directly. Rather, they are approximated very closely by three relatively simple structures. This is done for reasons of speed. The calculations need to be done in approximately 1/100th of a second. A computer system capable of doing the calculations this fast would be prohibitively expensive and approach the upper limit of presently available larger computer capabilities. In the future, as more and more computer power becomes available at very low prices, it is anticipated that all the calculations will be done exactly with no approximating equations needed.

At present, however, the approximation equations for equation (7) are described below. These are equations used to compute power factor for a given firing angle and the resultant conduction angle, $\gamma$.

The first part computes a constant, labeled D, which is related to the firing angle, $\lambda$. A 9-element array labeled A, containing 8-bit binary values, contains the following numbers:

A(0) = 255  A(1) = 247  A(2) = 234  A(3) = 220
A(4) = 201  A(5) = 176  A(6) = 146  A(7) = 113
A(8) = 76

The variable x represents the firing angle $\gamma$, and x is scaled so that 8,192 equals ½ cycle (8⅓ ms) of the 60 Hz power line.

Figure 7:
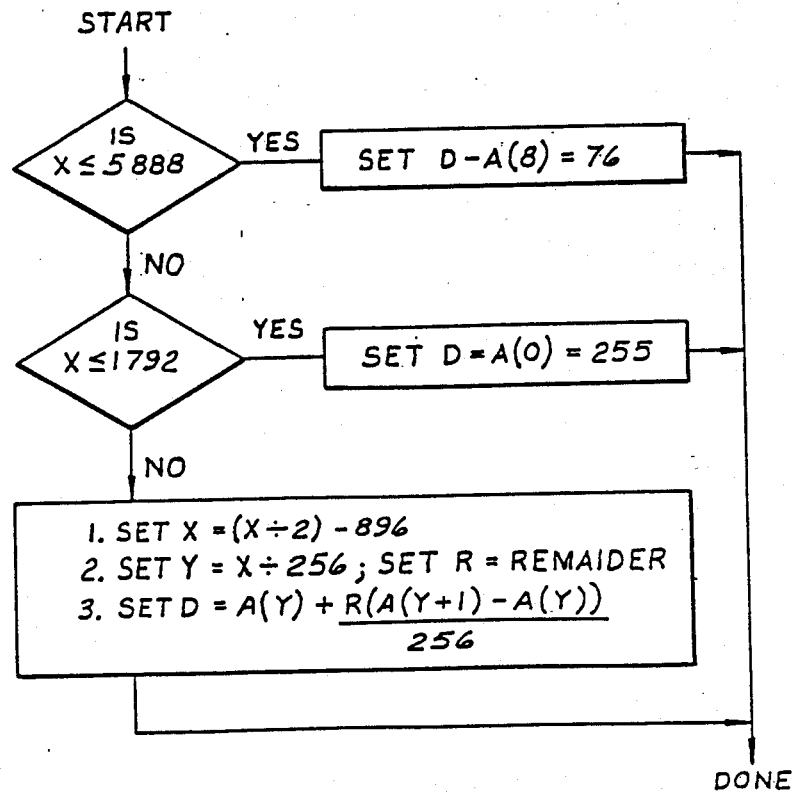
FIGS. 7 and 8 are typical flowcharts of algorithms for computing certain parameters in connection with the method of the present invention.

D is computed utilizing the algorithm expressed in the flowchart of FIG. 7. A basic program listing for the flowchart of FIG. 7 is provided below.

| | |
|---|---|
| 10 | Dimension A(8) |
| 20 | Let A(0) = 255 |
| 30 | Let A(1) = 247 |
| 40 | Let A(2) = 234 |
| 50 | Let A(3) = 220 |
| 60 | Let A(4) = 201 |
| 70 | Let A(5) = 176 |
| 80 | Let A(6) = 146 |
| 90 | Let A(7) = 113 |
| 100 | Let A(8) = 76 |
| 110 | If x ≧ 5887 then go to 200 |
| 120 | If x ≦ 1793 then go to 250 |
| 130 | Let x = (x/2) −896 |
| 140 | Let x = x/256 |
| 150 | Let R = X −(256 * y) |
| 160 | Let D = A(y) + R * (A (y + 1)−A(y)/256 |
| 170 | Return |
| 200 | Let D = A(8) |
| 210 | Return |
| 250 | Let D = A(0) |
| 260 | Return |

The second part uses the just-computed variable, D, plus the amount of time that current flows past the voltage zero crossing ($\gamma - t_1$, in FIG. 3, c, to compute the power factor C is scaled so that 8,192 equals 1/cycle (8⅓ ms) of the 60 Hz power line. C is related to $\gamma$, the total conduction angle by the equation C=2,607.5946 ($\lambda + \gamma - \pi$) where $\gamma$ and $\lambda$ are expressed in radians. C is defined in this way to simplify and speed calculations associated with this part of the calculation. The computation of the power factor uses an 8-element array, labeled B, which contains the following 16-bit binary numbers.

| | | |
|---|---|---|
| B(1) = 30,120 | B(2) = 28,367 | B(3) = 25,517 |
| B(4) = 21,822 | B(5) = 17,650 | B(6) = 13,686 |
| B(7) = 10,127 | B(8) = 7,144 | |

The other variables used are:

P=1.2 times percent power factor (the 1.2 sealing factor improves resolution)

D=firing angle correction factor (previously discussed)

Q=256 times P (256P)

R=VARIABLE

C=2,607.5946 ($\lambda + \gamma - \pi$)=conduction past zero

E=VARIABLE

Figure 8:
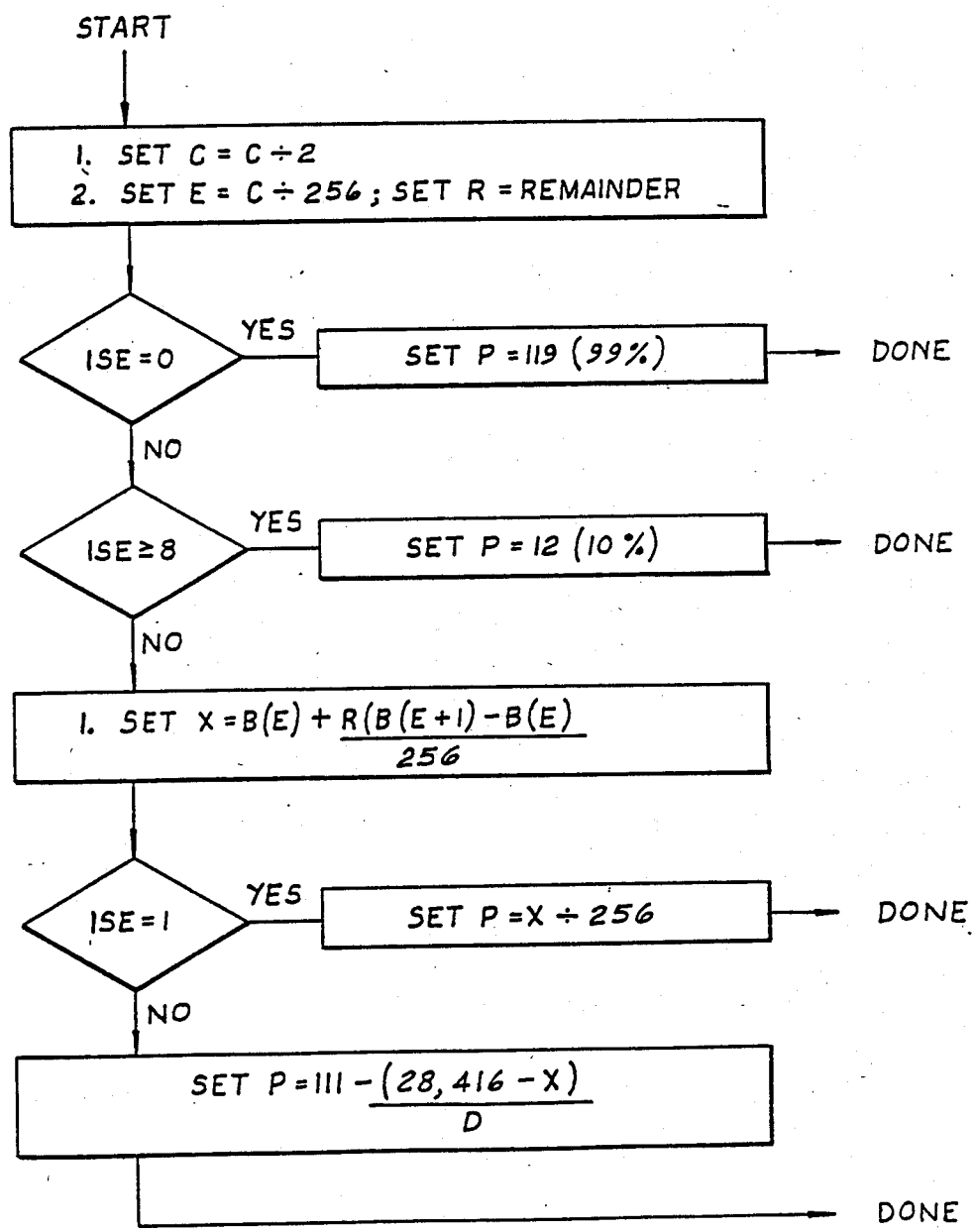

See FIG. 8 for the algorithm for determining P. A basic program listing for the flowchart illustrated in Figure is provided below.

| | |
|---|---|
| 10 | Dimension B(8) |
| 20 | Let B(1) = 30,120 |
| 30 | Let B(2) = 28,367 |
| 40 | Let B(3) = 25,517 |
| 50 | Let B(4) = 21,822 |
| 60 | Let B(5) = 17,650 |
| 70 | Let B(6) = 13,686 |
| 80 | Let B(7) = 10,127 |
| 90 | Let B(8) = 7,144 |
| 100 | Input C |
| 110 | Let C = C/2 |
| 120 | Let E = C/256 |
| 130 | Let R = C*256 - E |
| 140 | If E = 0 then go to 200 |
| 150 | If E ≧ 8 then go to 250 |
| 160 | Let X = B(E) + R(B (E+1) - B(E))/256 |
| 170 | If E=1, then go to 300 |
| 180 | Let P = 111- ((28416 - X) /D) |
| 190 | Return |
| 200 | Let P = 119 |
| 210 | Return |
| 250 | Let P = 12 |
| 260 | Return |
| 300 | P = X/256 |
| 310 | Return |

The resulting number, P, is then used to compute the firing angle in response to a user-set-percent heat or primary current value.

The method uses an equation of the form:

$$F = A - BX - CY + DZ$$

where X, Y, and Z are assigned values according to the following rules:

1. X=(percent heat−70) or zero, whichever is greater.
2. (a) If X=0, Y=(percent heat−30) or zero, whichever is greater
   (b) If X≠0, Y=40
3. (a) If Y≠0, z=percent heat
   (b) If Y≠0, Z=30

The coefficients A, B, C, and D are fetched from the table shown below. For each value of P, there is a set of A, B, C, and D coefficients. The table lists only every other value of P (only the even values). Interpolation is used when P is an odd value.

| P | A | B | C | D |
|---|---|---|---|---|
| 12 | 6053 | 14 | 18 | 36 |
| 14 | 6045 | 14 | 18 | 36 |
| 16 | 6038 | 15 | 19 | 37 |
| 18 | 6030 | 15 | 19 | 37 |
| 20 | 6023 | 15 | 19 | 38 |
| 22 | 6015 | 16 | 20 | 38 |
| 24 | 6008 | 16 | 20 | 39 |
| 26 | 6000 | 16 | 21 | 39 |
| 28 | 5992 | 17 | 21 | 39 |
| 30 | 5985 | 17 | 22 | 40 |
| 32 | 5977 | 17 | 22 | 40 |
| 34 | 5970 | 18 | 23 | 40 |
| 36 | 5962 | 18 | 23 | 41 |
| 38 | 5951 | 18 | 23 | 41 |
| 40 | 5939 | 19 | 24 | 41 |
| 42 | 5928 | 19 | 24 | 41 |
| 44 | 5916 | 20 | 24 | 41 |
| 46 | 5905 | 20 | 25 | 41 |
| 48 | 5894 | 21 | 25 | 42 |
| 50 | 5882 | 21 | 25 | 42 |
| 52 | 5871 | 22 | 26 | 42 |
| 54 | 5859 | 22 | 26 | 42 |
| 56 | 5848 | 23 | 26 | 42 |
| 58 | 5836 | 23 | 27 | 42 |
| 60 | 5825 | 24 | 27 | 42 |
| 62 | 5833 | 25 | 28 | 43 |
| 64 | 5840 | 26 | 28 | 43 |
| 66 | 5848 | 26 | 29 | 44 |
| 68 | 5855 | 27 | 29 | 45 |
| 70 | 5863 | 28 | 30 | 45 |
| 72 | 5871 | 29 | 31 | 46 |
| 74 | 5878 | 29 | 31 | 47 |

-continued

| P | A | B | C | D |
|---|---|---|---|---|
| 76 | 5886 | 30 | 32 | 47 |
| 78 | 5893 | 31 | 32 | 48 |
| 80 | 5901 | 32 | 33 | 49 |
| 82 | 4908 | 33 | 33 | 49 |
| 84 | 5916 | 33 | 34 | 50 |
| 86 | 5927 | 35 | 34 | 50 |
| 88 | 5939 | 36 | 35 | 51 |
| 90 | 5950 | 38 | 35 | 51 |
| 92 | 5962 | 40 | 36 | 51 |
| 94 | 5973 | 41 | 36 | 52 |
| 96 | 5985 | 43 | 37 | 52 |
| 98 | 5996 | 45 | 37 | 52 |
| 100 | 6007 | 46 | 38 | 53 |
| 102 | 6019 | 48 | 38 | 53 |
| 104 | 6030 | 50 | 39 | 53 |
| 106 | 6042 | 51 | 39 | 54 |
| 108 | 6053 | 53 | 40 | 54 |
| 110 | 6098 | 58 | 40 | 52 |
| 112 | 6144 | 63 | 41 | 50 |
| 114 | 6189 | 67 | 41 | 48 |
| 116 | 6236 | 72 | 42 | 46 |
| 118 | 6280 | 77 | 43 | 44 |

F, the the result, is the firing angle $\gamma$, expressed as a binary number scaled so that 8,192 equals 180 degrees ($\pi$ radians or 8⅓ milliseconds).

If the user-entered value is in terms of current rather than percent heat, the same table and equation is used, but with a slightly different method.

If the values of $I_{RMS(max)}$ (as in equation (14)) or P (power factor) are not known, the first cycle of the weld is fired at a large value of F, corresponding to a low current with a lower power factor. Measurements of i and $\gamma$ (conduction angle) are taken, and the power factor value P is determined. Using this value of P to find the correct A, B, C, D coefficients and using the value of F that was used, the values of X, Y, and Z are determined. From these values, the effective percent heat can be found using the rules set forth above, backwards.

The value of $I_{RMS(max)}$ can be computed using the simple relationship:

$$I_{RMS(max)} = I_{RMS\ (measured)} \times \frac{1}{\sqrt{\%\ heat}}$$

Since -percent heat. That is, the energy delivered to the resistive part of an L-C series circuit is equal to $i^2R$.

The firing point for the next cycle is computed by calculating a percent heat setting from the relationship and going through the calculations as previously described.

$$\%\ Heat = \left(\frac{I_{RMS\ (user-set)}}{I_{RMS(max)}}\right)^2$$

Power line voltage compensation is implemented inherently in the user-set current mode. $I_{RMS(max)}$ is recalculated each cycle, using the measured values of i and. Since the measured value of i will shift in direct proportion to power line voltage changes, so will the value of $I_{RMS(max)}$, and the percent heat value calculated from it will change so as to compensate for the change in power line voltage.

Thus, with the welding control of the invention, changes in the power factor of the welding circuit of the welding structure 10 may be compensated for. It is not unusual to observe five percent power factor variations in a resistance welder due to the positioning of the part or the automation holding the part in the magnetic field around the secondary circuit of the welder. Parts being welded and/or the automation handling them are most often ferrous metals, which when placed in the magnetic field of the welder secondary circuit, tend to increase the effective inductance of the circuit. When the inductance increases, the ratio of resistance to inductance, and thus the power factor, is reduced. Increased inductance causing a change in power factor will cause a reduction of power delivered to the resistive portion of the circuit, which is primarily the welds, in an amount proportional to the square of the power factor change. If, however, the control is constantly measuring firing angle delay and conduction angle past zero crossing, and using this information to compute power factor, then it is possible to correct for power factor variations as well as line voltage variations in order to eliminate any effect they might have on the energy flow delivered to the weld.

From the foregoing, it can be appreciated that the welder control 50 and method described above are useful in maintaining a constant energy at the weld, independent of the power factor and power line variations. The conduction angle of the contactor, or the angle difference between the line current and line voltage, together with the firing delay angle, are used to measure the ratio of inductance to resistance in the welder circuit. This information, as described above, can be used to select the correct function of the relationship between the firing angle delay and energy flow so that a percentage-wise linear heat control is provided. This percentage-wise linear heat control is in turn employed to control correction for power line voltage variations.

The method of the present invention effectively measures the welding transformer primary voltage and current in order to measure the effective impedance hooking into the welding transformer primary. The resistance of the weld itself is a major component of this impedance, and measurements of the welding transformer primary circuit impedance can be used to detect changes in welding resistance. Weld resistance generally shifts upward as the material being welded is heated. It is a characteristic of most metals that their electrical resistivity rises with temperature. However, in a resistance weld, such rise in resistance stops, and a drop in resistance will be observed if at any time the metal being welded reaches its melting temperature. The reason for this is that when the metal liquifies, the resistance associated with the interface between the sheets of metal being welded disappears. Since this interface resistance is a substantial portion of the overall resistance of the weld, the sudden diminishment of such resistance is readily observable.

Specifically, a drop in weld resistance appears in the impedance of the primary circuit of the welding transformer. If properly interpreted, small abrupt drops in the welding transformer primary circuit impedance can be used to detect weld expulsion.

In connection with the method of the present invention, stepper decision making, that is, the decision of the level of current to be applied and incrementing of the current during successive welds, is based upon the apparent power factor looking into the primary of the resistance welding transformer, which power factor is directly related to the ratio of inductive to resistive impedance in the welding circuit. Using the welding controller shown in FIG. 6, a measurement is taken of the power factor once every cycle (1/60 second) of the power line voltage while welding current is flowing. Such readings of power factor reflect resistive changes in the weld itself.

The weld controller continually increases the welding current in a step function for successive welds, until it detects that some small portion of the welds are experiencing expulsion near the end of the time that welding current is applied. If too large a proportion of the welds experience expulsion, the welding current is decreased slightly. However, if too small of a portion of the welds experience expulsion, the welding current is increased slightly. Measurements of an apparent power factor looking into the primary of the resistance welding transformer are used to detect weld expulsion.

Typically, current is applied to the weld for periods of about ¼ second, i.e. fifteen cycles of the 60 Hz power line. As a result of the characteristics of the services of the materials commonly welded, the power factor readings taken during about the first third of the time that welding current is applied do not yield any useful information about weld expulsion. Accordingly, according to the present invention, a user-settable parameter referred herein as the blanking interval is provided so that power factor readings taken during the first part of the time that the welding current is applied are ignored in determining whether the weld current should be increased or decreased. This blanking interval commences concurrently with the flow of welding current and continues for a user-settable period of time.

After the blanking interval has expired, the welding controller commences looking for an abrupt drop in the power factor readings. At this point, following the blanking interval, in the absence of weld expulsion, the readings of the power factor generally change gradually from cycle to cycle and tend to be rising. A user-settable parameter in the welding controller is provided to determine how much of a drop in the power factor reading from one cycle to the next signifies expulsion. Typically, this setting is on the order of one percent power factor change.

In accordance with a further aspect of the invention, the welding controller effectively employs a pair of counters for respectively counting "bad" welds, i.e. welds where expulsion has occurred, and "good" welds, i.e. welds where no expulsion has occurred. After each weld where expulsion has occurred, the bad counter is incremented; however, after each weld where no expulsion has been detected, the good counter is incremented. Such counters can, of course, be implemented via hardware in the welding controller; however, in the preferred form of the invention, such counters are realized in the controller's software.

After each weld, the contents of the good and bad counters are compared to two preselected, user-entered values, herein called "good weld limit" and "bad weld limit." If the value in the good counter equals or exceeds the good weld limit, the welding current is increased slightly, and both the good and bad weld counters are reset to zero. If the value in the bad counter equals or exceeds the bad weld limit, then the welding current is decreased slightly, and both the good and bad counters are reset to zero. By way of example, the good weld limit may be set to 50, and the bad weld limit may be set to 3; however, these numbers can vary widely for different welding applications and conditions.

By way of further example, using 50 and 3 respectively for "good" and "bad" limits, the welding controller will attempt to adjust the welding current to make 3 out of 53 welds so as to exhibit expulsion and 50 out of 53 welds without expulsion. As the welding electrodes deteriorate, the current needed to approach the limit of expulsion will rise, and fewer welds will be made with expulsion. In response, according to the present invention, the welding controller will recognize that the "good" counter reaches its limit before the "bad" counter and thus increases the welding current. Accordingly, as the welding electrodes deteriorate, the welding current is constantly increased so that it is always close to the limit of expulsion, which is the ideal value for maximum production welding.

The magnitude of welding current increase or decrease in response to an excess number of "good" or "bad" welds is a user-set parameter herein called "correction step." Typically, this correction step is set to about one percent of the total welding current. If, as a result of applying the correction step amount to the then-current welding current, the new welding current is unattainable, the controller will generate an error message to the user and thus require some sort of remedial action by the operator.

Figure 9:
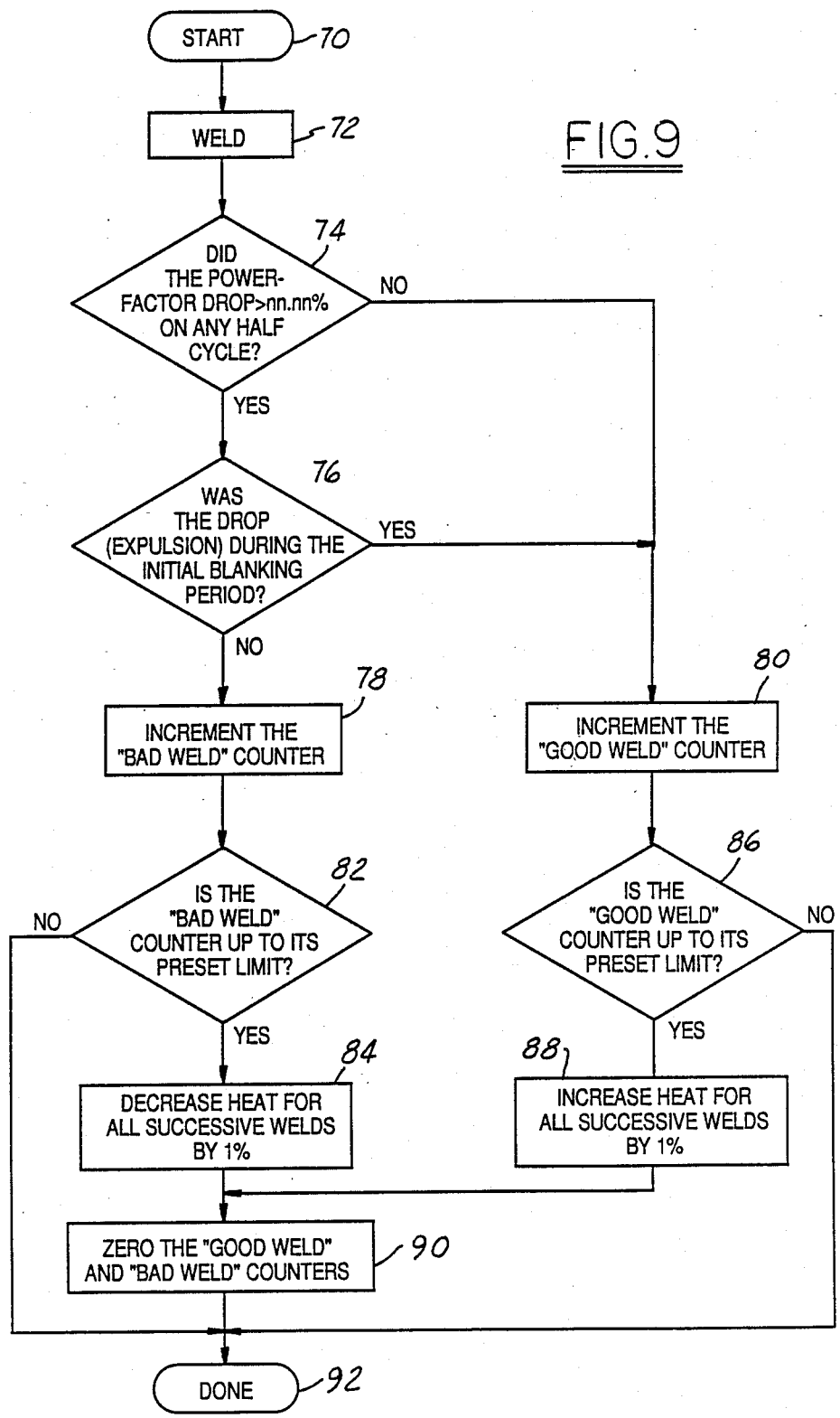
FIG. 9 is a flowchart for a computer program employed to practice the method of the present invention.

While those skilled in the art will recognize that the foregoing method of the present invention can easily be implemented by way of hardware and electronic circuitry, the preferred embodiment of the invention employs computer software for use in combination with the welding controller previously described in connection with FIG. 6. A typical flowchart for such software is depicted in FIG. 9. Upon starting the program at 70, a weld is produced at 72, during which time the voltage and current and the primary circuit are detected by the pick-up devices 56, 58, and the power factor is calculated using the computation circuitry 50 (FIG. 6). The power factor is measured for each half-cycle of the weld and the rise or drop of the power factor is calculated from each previous half-cycle. Thus, at 74, a determination is made of whether or not the power factor fell below a prescribed level of any half-cycle, thus indicating whether or not weld expulsion occurred on the last weld. If expulsion occurred, a drop in the power factor more than the preselected level is detected, and the program continues to block 76. However, if the power factor did not drop below the preselected level, the good weld counter is incremented at 80. If indeed the power factor dropped below the preselected level for the previous half-cycle, a determination is then made of whether or not the drop was made during the initial blanking period at 76. If such drop did in fact occur during the initial blanking period, the good weld counter is incremented; otherwise, the bad weld counter is incremented at 78. Assuming the bad weld counter is incremented, a determination is then made at 82 as to whether the bad weld counter has reached its preset limit; if so, the current for all successive welds is reduced by a preselected amount, e.g. one percent, at 84, otherwise, the loop is complete. If, in fact, the current is reduced at 84, then the good weld and bad weld counters are reset or zeroed at 90, thus ending the loop. In the event that the good weld counter is incremented at 80, a determination is then made of whether or not the good weld counter has reached its preset limit at 86. If the good weld counter has not reached its preset limit, the loop is complete or done at 92. If, however, the good weld counter has indeed reached its preset limit, the current for all successive welds is increased by a preselected amount, e.g. one percent, at 88, and the good and bad weld counters are then zeroed at 90. After reaching the finish at 92, the controller waits for the next weld to occur.

Having thus described the invention, it is recognized that those skilled in the art may make various modifications or additions to the preferred embodiment chosen to illustrate the invention without departing from the scope and spirit of the present contribution to the art. Accordingly, it is understood that the protection sought and to be afforded hereby should be deemed to extend to the subject matter claimed and all equivalents thereof fairly within the scope of the invention.

I claim:

1. For use in a resistance welding process in which an alternating electrical current is delivered to a metal workpiece through a circuit including electrodes to produce a weld caused by localized melting of the workpiece, wherein the application of an excessive amount of said current results in expulsion of molten metal from said weld thereby diminishing the quality of said weld, a method of controlling the magnitude of current delivered to said workpiece through said electrodes, comprising the steps of:
   (A) determining the time interval $t_1$ between the application of voltage to said electrodes and the following zero crossover of said voltage;
   (B) determining the time interval $t_2$ between said zero crossover point of said voltage and the following zero point of the current resulting from said application of voltage;
   (C) determining the value of the power factor of said circuit using the time intervals $t_1$, $t_2$ determined in steps (A) and (B), the expulsion of molten metal from said weld being a function of the value of the power factor determined in step (B); and
   (D) changing the magnitude of said current based at least in part on the value of the power factor determined in step (C).

2. The method of claim 1, including the step of determining the change in electrical resistance of said weld using the value of said power factor determined in step (C), said change in resistance being related to the magnitude of expulsion of molten metal from said weld.

3. The method of claim 1, wherein steps (A)–(C) are performed repeatedly respectively on successive welds and step (D) is performed only when the value of the power factor determined in step (C) for each of a plurality of welds is in a preselected relationship to a reference value corresponding to a weld in which at least some degree of expulsion of molten metal occurs.

4. The method of claim 3, wherein step (D) is performed by decreasing the magnitude of said current when the value of the power factor determined in step (C) for each of a preselected number of welds indicates the occurrence of expulsion of molten material in said latter-mentioned welds.

5. The method of claim 3, wherein step (D) is performed by increasing the magnitude of said current when the value of the power factor determined in step (C) for each of a preselected number of welds indicates that expulsion of molten material has not occurred in any of said latter-mentioned welds.

6. The method of claim 1, wherein the performance of step (C) is delayed a preselected period of time after commencement of the flow of electrical current through said electrodes to said weld.

7. The method of claim 1, including the step of choosing a blanking interval during which no changes in said magnitude of said current can be made, step (D) being commenced only after completing step (E).

8. The method of claim 1, wherein steps (A)–(C) are repeatedly performed respectively for a plurality of successive welds, with the quality of said welds being related to the respective power factors determined in step (C) for each weld, and said method further includes the steps of:
   (E) classifying the welds into acceptable welds and unacceptable welds based on the respective power factors determined in step (C); and
   (F) accumulating first and second counts respectively of said acceptable and unacceptable welds wherein at least some expulsion of molten material has occurred in said unacceptable welds and essentially no expulsion of molten material has occurred in said acceptable welds.

9. The method of claim 8, including the steps of:
   (G) comparing said first and second counts respectively with first and second reference values; and
   (H) changing the magnitude of said current based on the comparison performed in step (G).

10. The method of claim 8, including the steps of:
    (G) comparing said first and second counts respectively with first and second reference values;
    (H) when said first count is equal to or exceeds said first reference value, increasing said current and resetting said second count; and
    (I) when said second count is equal to or exceeds said second reference value, decreasing said current and resetting said first and second counts.

11. For use with resistance welding apparatus of the type having a transformer including a primary circuit, said primary circuit including a source of alternating electrical current and switching means for selectively switching said alternating electrical current to the primary of said transformer, said transformer having a secondary circuit including a pair of electrodes for applying electrical current to a workpiece to be welded, wherein the application of an excessive level of current to said workpiece results in expulsion of molten material from said weld thereby diminishing the quality of said weld, a method of controlling the level of current applied to said weld, comprising the steps of:
    (A) determining the point in time when said switching means is switched to apply voltage from said current source to said transformer primary, said current commencing to flow in said primary and secondary circuits upon said application of voltage to said transformer primary;
    (B) determining the time intervals $t_1$, $t_2$ between the point in time determined in step (A) and the subsequent respective zero points of the alternating voltage and current applied to said transformer primary;
    (C) determining the change in impedance in said primary circuit based on the time intervals $t_1$, $t_2$ determined in step (B), said change in impedance being related to changes in the resistance in said primary circuit caused by the formation of said weld; and
    (D) changing the magnitude of said current based at least in part on the change in impedance determined in step (C).

12. The method of claim 11, wherein steps (A)–(C) are performed repeatedly respectively on successive welds and step (D) is performed only after the value of the impedance determined in step (C) is determined to be in a preselected relationship to a reference value with respect to at least one of said welds in which at least some degree of expulsion of molten metal occurs in said one weld.

13. The method of claim 11, wherein the performance of step (C) is delayed a preselected period of time after commencement of the flow of electrical current in said secondary circuit.

14. The method of claim 11, including the step of selecting a blanking interval during which no changes in said magnitude of current can be made based on the impedance determined in step (C).

15. The method of claim 11, wherein steps (A)–(C) are repeatedly performed respectively for a plurality of successive welds, with the quality of said welds being related to the respective changes in impedances determined in step (C) for each weld, and said method further includes the steps of:

(E) classifying the welds into acceptable and unacceptable welds based on the change in impedance determined in step (C); and
(F) accumulating first and second counts respectively of said acceptable and unacceptable welds, wherein at least some expulsion of molten material has occurred in said unacceptable welds and essentially no expulsion of molten material has occurred in said acceptable welds.

16. The method of claim 15, including the steps of:
(G) comparing said first and second counts respectively with first and second reference values; and,
(H) changing the magnitude of said current based on the comparison performed in step (G).

17. The method of claim 15, including the steps of:
(G) comparing said first and second counts respectively with first and second reference values;
(H) when said first count is equal to or greater than said first reference value, increasing said current and resetting said second count; and
(I) when said second count is equal to or greater than said second reference value, decreasing said current and resetting said first and second counts.

* * * * *